Jan. 8, 1963  G. PODZUWEIT  3,072,816
ELECTRODE DEVICE AND METHOD OF PRODUCING THE SAME
Filed July 13, 1960
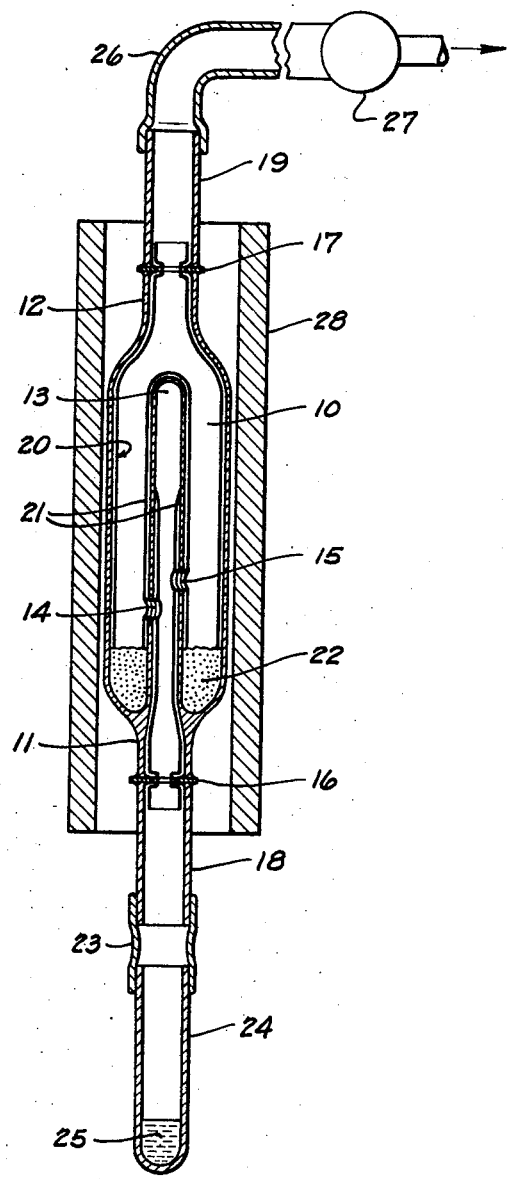
INVENTOR:
GERT PODZUWEIT
BY
Morgan, Finnegan, Durham & Pine
ATTORNEYS.

United States Patent Office 3,072,816
Patented Jan. 8, 1963

3,072,816
ELECTRODE DEVICE AND METHOD OF PRODUCING THE SAME
Gert Podzuweit, Unterageri, Zug, Switzerland, assignor to Landis & Gyr, A.G., Zug, Switzerland, a body corporate of Switzerland
Filed July 13, 1960, Ser. No. 42,634
Claims priority, application Switzerland Aug. 5, 1959
6 Claims. (Cl. 313—216)

The present invention relates to electrode apparatus comprising a vessel having at least two separate electrodes, which apparatus may be used, for example, as a gas-discharge tube, ionization chamber, vacuum tube and the like.

Objects and advantages of the invention will be set forth in part hereinafter and in part will be obvious herefrom, or may be learned by practice with the invention, the same being realized and attained by means of the instrumentalities and combinations pointed out in the appended claims.

The apparatus according to the invention, differs from the known constructions in that each of the electrodes consists of a non-metallic, electrically conductive coating on a support of electrical insulating material.

The method according to the invention consists essentially in that the support for the electrodes is formed of heat-resisting material, the surfaces of the support which are to be coated with the electrodes are introduced, together with a predetermined quantity of the reagents necessary to form the coatings, into an enclosed chamber, the parts of the support to be provided with a coating are heated, the chamber is evacuated and then the reagents are heated in such a manner that they all vaporize at least at substantially the same time and then form uniform coatings on the heated surfaces of the support which are exposed to the evacuated chamber.

The invention consists in the novel parts, constructions, steps, methods, arrangements, compositions, combinations and improvements herein shown and described.

Various other methods of producing electrically conducting, non-metallic coatings of metallic oxides on heat-resisting supports of electrical insulating material such as glass, ceramics, porcelain, are already known wherein the supports to be coated are heated to a temperature of 300 to 800° C., for example, and brought into contact, in the hot state, with certain chemical reagents which contain the constituents of the coating to be formed. Hitherto, this was effected either by immersing the heated support in a liquid containing the reagents, by dusting the heated support with the reagents by means of a spray gun, by applying a solution containing the reagents in the form of mist, by vaporizing the solution of the reagents dried in a filter paper, by heating and burning the filter paper, or by vaporizing tin chloride crystals by heating. The constitution and properties of the resulting coatings, such as thickness, adhesion to the supports, electrical conductivity, work function of the electrons, coloring, homogeneity, temperature coefficient of the electrical resistance, etc., were largely dependent on the methods used and the production conditions, such as the preliminary treatment of the support, composition and age of the solution used, temperature variations during the reaction, duration of the action, pressure, air humidity, etc. If it was desired to produce uniform coatings with specific properties which could be reproduced, then numerous conditions had to be accurately adhered to, which is very difficult in the majority of cases. The production methods hitherto used therefore entailed considerable disadvantages which are largely overcome by the method according to the invention.

In the drawing, the single figure shows diagrammatically and in section, by way of example, apparatus according to the invention operable, for example, as a gas-discharge tube, together with the means used to produce it.

The glass bulb 10 of a gas-discharge tube consists of a cylindrical center portion and is narrowed at its two end portions 11 and 12. In the interior of the glass bulb 10 is a piece of tubing 13 which likewise consists of glass and which is fused at one end to one of the narrowed end portions 11 of the bulb 10. The other end of the inner piece of tubing 13 is closed. Through two lateral apertures 14 and 15 in the piece of tubing 13, its interior is in communication with that of the bulb 10. Fused in a gas-tight manner to the end face of each of the narrowed tubular end portions 11 and 12 is a perforated metal disc 16, 17 preferably of molybdenum, which in turn is fused, in a gas-tight manner, to a tube connection 18, 19 of glass which is arranged coaxially with the corresponding tubular end portion 11, 12 of the bulb 10. The outer circumferential portions of the discs 16 and 17 project somewhat beyond the outside of the glass portions 11 and 18, 12 and 19 respectively, so that the discs are accessible from the outside. The inner circumferential portion of the discs 16 and 17 likewise projects in a similar manner from the glass. When the discharge tube is in the condition ready for use, the two tube connections 18 and 19 are sealed. In the drawing, however, the discharge tube is illustrated in the partially finished condition.

The glass bulb 10 is the support for an electrode 20 which is applied, in the form of an electrically conductive, non-metallic coating, to the inner face of the bulb 10 and which consists of a metallic oxide. The coating 20 extends beyond the metallic disc 17 into the tube connection 19 so that the inner circumferential portion of the disc 17 is completely covered by the coating 20.

The inner piece of tubing 13 is the support for a second electrode 21 which is opposite to and spaced apart from the electrode 20 and which is likewise formed by an electrically conducting, non-metallic coating of the same substance. The coating 21 is not only on the outer face but also on the inner face of the piece of tubing 13 and on the edges of the apertures 14 and 15. The coating 21 extends beyond the metallic disc 16 into the tube connection 18 so that the internal circumferential portion of the disc 16 is completely covered by the coating 20.

The discs 16 and 17 serve for the electrical connection of the electrodes 20 and 21 to external conductors which are brought into contact with the external circumferential portions of the discs 16 and 17.

The discharge tube described has the important advantage that, apart from the electrode connecting discs 16 and 17, it does not comprise any metallic components which might corrode. Even the discs 16 and 17 are effectively protected from the corrosive influences of the gas filling of the tube by the coatings 20 and 21 because the gas has no access to the discs 16 and 17. Thus there is absolutely no risk of corrosion, as a result of which the life of the tube is extended considerably in comparison with the known constructions. This is particularly important in counter tubes in which a halogen is used as a quenching gas.

In a modification which is not illustrated, the inner piece of tubing 13 may be open at its free upper end, in which case the apertures 14 and 15 may be dispensed with because then the portions of the coating 21 which are present on the outside and on the inside of the piece of tubing 13 are joined together at the upper end of the piece of tubing 13.

In the manufacture of the discharge tube described, the procedure may, for example, be as follows:

First the bulb 10 and the inner piece of tubing 13 are formed and fused together by a glass blower or mechanically. Then the narrowed end portions 11 and 12 of the bulb 10 are connected to the tube connections 18 and 19 with the interposition of the metal discs 16 and 17. Apart from the sealing of the two tube connections 18 and 19 which is to be carried out later, all the glass-blowing work is now finished. The work is cleaned and relieved of stress by the action of heat before the coatings serving as electrodes 20 and 21 are applied. These coatings are produced in a single operation.

Through the tube connection 19, a small quantity of powdered, heat-resisting material 22, which may consist of graphite, chamotte, mica, glass, etc., is introduced between the glass bulb 10 and the inner piece of tubing 13 and is later removed again. By means of a rubber tube 23 a small glass vessel 24, which contains in solid form or in solution a predetermined quantity of the reagents 25 necessary to form the coatings 20 and 21, is connected to the lower tube connection 18. A vacuum pump 27, which may be a water-jet vacuum pump, is connected to the upper tube connection 19 by means of a rubber tube 26. An electrical heating device 28 is arranged around the bulb 10 and around the discs 16 and 17.

After or while the parts 10, 11, 12, 13, 16 and 17 to be coated have been or are being heated to a temperature of 500° C. for example, by means of the heating device 28, the interior of the bulb 10, of the inner piece of tubing 13 and of the vessel 24 is evacuated. When a sufficient reduced pressure has been reached, the vessel 24 is rapidly heated, for example, by means of a gas flame, to such a temperature that all the reagents 25 contained in the vessel 24 vaporize at least substantially at the same time. The vapor formed and any liquid particles which may be contained therein spread immediately and uniformly over the evacuated space and come into contact with the surfaces of the vacuum chamber which have been heated by the heating device 28, as a result of which a coating of uniform thickness is formed on these as a result of a chemical reaction. Then air or a gas can be admitted into the evacuated chamber and the coated bulb cooled down. Finally the powdered material 23 is shaken out of the hollow body 10 as a result of which the two electrodes 20 and 21 are separate as desired.

Since the coating forming the electrode 20 also covers the inner circumferential portion of the annular disc 17 and adheres thereto as firmly as to the inner face of the glass bulb 10, the outer circumferential portion of the disc 17 may satisfactorily be used for the electrical connection of the electrode 20 to external conductors. The coating forming the electrode 21 is continued, through the apertures 14 and 15 in the piece of tubing 13, onto the inner face of the latter and the narrowed end portion 11 of the bulb 10 and also covers the inner circumferential portion of the annular disc 16 so that its outer circumferential portion can serve for the electrical connection of the electrode 21 to external conductors.

In order to obtain a definite boundary for the coatings forming the electrodes 20 and 21 in the interior of the tube connections 19 and 18, it is possible, by means of an appropriate construction of the heating device 28, to ensure that a sharper drop in temperature appears at the desired boundary points, but if it is desired to make the boundary points independent of the extent of the effective heating zone, the inner faces of these tube connections may be partially provided with a heat-resisting covering before the beginning of the process of producing the coatings, which covering can later be removed again together with the reagents precipitated thereon. Such a covering for masking the surfaces which are not to be coated may consist, for example of $Al_2O_3$, $MgO$ or graphite. A similar covering could also be used instead of the powdered material 22 in order to be able to produce subsequently the desired separation between the electrodes 20 and 21.

The delimitation of the electrodes 20 and 21 in the tube connections 19 and 18 may also be effected by means of inserted pieces of tubing which are later removed again from the connections 18 and 19.

When the non-metallic electrodes 20 and 21 have been produced, the tube is again evacuated, filled with the desired gas and closed in a gas-tight manner by sealing the tube connections 18 and 19. The gas-discharge tube is thus finished.

The method described has the following important advantages.

As a result of the fact that the production of the coatings forming the electrodes takes place under vacuum in a chamber which is shut off from the outside, it is independent of external influences such as atmospheric pressure, air humidity, etc. The reagents are applied in comparatively small amounts to the support to be coated so that this does not cool appreciably in contrast to the irregular and severe cooling as a result of a stream of gas, vapor or mist or in the immersion process. According to the laws of gas kinetics, the volatile particles spread more easily and uniformly over the whole evacuated chamber, on vaporization of the reagents, than in an atmosphere of gas. Furthermore, the surfaces of the support to be coated are decontaminated by the cooperation of temperature and vacuum, immediately before the application of the layer, and experience in the vacuum art shows that this contributes to an increase in the adhesive capacity of the coatings to the supports. Furthermore, the method produces results which can better be reproduced than the methods hitherto known and previously mentioned. The need for a vacuum pump does not involve any important complications because a simple water-jet pump meets the practical requirements. In return, additional devices for atomizing a solution and setting members such as valves, nozzles, etc. for such devices, are omitted. The powerfully corrosive and unhealthy vapors which are formed during the production of metallic oxide layers are retained by the boundaries of the vacuum chamber and drawn off by the vacuum pump and rendered harmless.

It is of significant importance that the method described offers the possibility of producing non-metallic electrodes which may have very complicated shapes as is frequently the case, for example in electronic valves. Hitherto, such electrodes had to be produced from metal parts because the known methods of producing non-metallic coatings did not permit of any satisfactory solutions in these cases. Apart from the advantages offered by the metal-free electrodes in themselves, there are considerable simplifications in the production of devices comprising such electrodes as a result of the fact that complicated and time-consuming methods of treatment for stress relief of glass, for cleaning and pacifying it and for decontaminating the metal parts, are eliminated.

The invention in its broader aspects is not limited to the specific steps, methods, compositions and apparatus shown and described but departures may be made therefrom within the scope of the accompanying claims without departing from the principles of the invention and without sacrificing its chief advantages.

What is claimed is:

1. An electrode device comprising a vessel having a plurality of electrodes, said electrodes consisting of non-metallic and normally non-volatilizable electrically conductive coatings on supports of electrical insulating material and means for making electrical connections to said electrodes from the exterior of said vessel.

2. A device as claimed in claim 1, wherein said vessel comprises a glass bulb and a glass support in the interior thereof and fused thereto and wherein one of said electrodes comprises an electrically conductive coating on the inner face of said glass bulb and another of said electrodes comprises an electrically conductive coating on the outer face of said inner glass support, said support being provided with at least one aperture for the passage of vapors.

3. A device as claimed in claim 1, characterized in that there is provided for the making of an electrical connection to said electrodes respective metal members, said members being sealed in a vacuum-tight manner to said vessel and having respective portions which are accessible from the outside of said vessel and respective portions which are accessible from the interior of said vessel, said inner portions being completely covered by respective coatings of said electrodes.

4. A device as claimed in claim 3, characterized in that said vessel comprises a glass bulb having two narrowed, tubular end portions on each of which is mounted one of said metal members, said bulb further comprising an inner glass tubular support which is fused to one of said end portions and wherein one of said coatings traverses the inner face of said support, and said fused end portion including said inner portion of the respective metal member.

5. A device as claimed in claim 4, characterized in that each of said metal members comprises a perforated disc which is sealed between the respective tubular end portion of said glass bulb and a glass connection.

6. A device as claimed in claim 1, characterized in that each of said electrodes consists of a metallic oxide.

References Cited in the file of this patent

UNITED STATES PATENTS

| | | |
|---|---|---|
| 2,233,276 | Zworykin et al. | Feb. 25, 1941 |
| 2,265,068 | Foerste | Dec. 2, 1941 |
| 2,367,595 | Marden | Jan. 16, 1945 |
| 2,380,811 | Walker | July 31, 1945 |